United States Patent [19]

King et al.

[11] Patent Number: 4,899,956
[45] Date of Patent: Feb. 13, 1990

[54] SELF-CONTAINED SUPPLEMENTAL GUIDANCE MODULE FOR PROJECTILE WEAPONS

[75] Inventors: Maurice E. King, Rancho Palos Verdes, Calif.; Gregory M. Katucki, Harleysville, Pa.

[73] Assignee: Teleflex, Incorporated, King of Prussia, Pa.

[21] Appl. No.: 221,933

[22] Filed: Jul. 20, 1988

[51] Int. Cl.[4] .......................... F41G 7/22; F42B 15/033
[52] U.S. Cl. .................................. 244/3.21; 102/293; 244/3.22
[58] Field of Search ............................ 244/3.21, 3.22; 102/293

[56] References Cited

U.S. PATENT DOCUMENTS

| | | | |
|---|---|---|---|
| 2,976,806 | 3/1961 | Risk et al. | 102/293 |
| 3,034,434 | 5/1962 | Swaim et al. | 244/3.22 |
| 3,141,411 | 7/1964 | Menke | 244/3.21 |
| 3,327,631 | 6/1967 | Howard et al. | 102/215 |
| 4,051,414 | 9/1977 | Will et al. | 102/293 |
| 4,167,818 | 9/1979 | Cantarella et al. | 33/366 |
| 4,328,938 | 5/1982 | Reisman et al. | 244/3.21 |
| 4,364,530 | 12/1982 | Ripley-Lotee et al. | 244/3.22 |
| 4,372,212 | 2/1983 | Hoelzen et al. | 102/264 |
| 4,374,577 | 2/1983 | Brown et al. | 244/3.21 |
| 4,444,119 | 4/1984 | Caponi | 244/3.22 |

Primary Examiner—Charles T. Jordan
Attorney, Agent, or Firm—Steele, Gould & Fried

[57] ABSTRACT

A self-contained supplemental guidance module for use with projectile weapons having a connected body and payload in attachable to the weapon between the body and payload, and includes self-contained power supply, inertial sensors and a plurality of incremental charges angularly spaced around an outer periphery of the module. A control processor in the module is operable responsive to the position of the module as detected by the sensors to calculate deviation of the projectile from a nominal flight path, taking gravity into account, and to detonate individual incremental charges when deviation exceeds a threshold and the incremental charge is in position to reduce the deviation. The supplemental guidance module is particularly applicable to barrage rockets, and includes a multi-level safe-and-arm apparatus initiating operation with sufficient axial thrust and disabling operation in the event of loss of sensor signals.

22 Claims, 8 Drawing Sheets

U.S. Patent    Feb. 13, 1990    Sheet 1 of 8    4,899,956
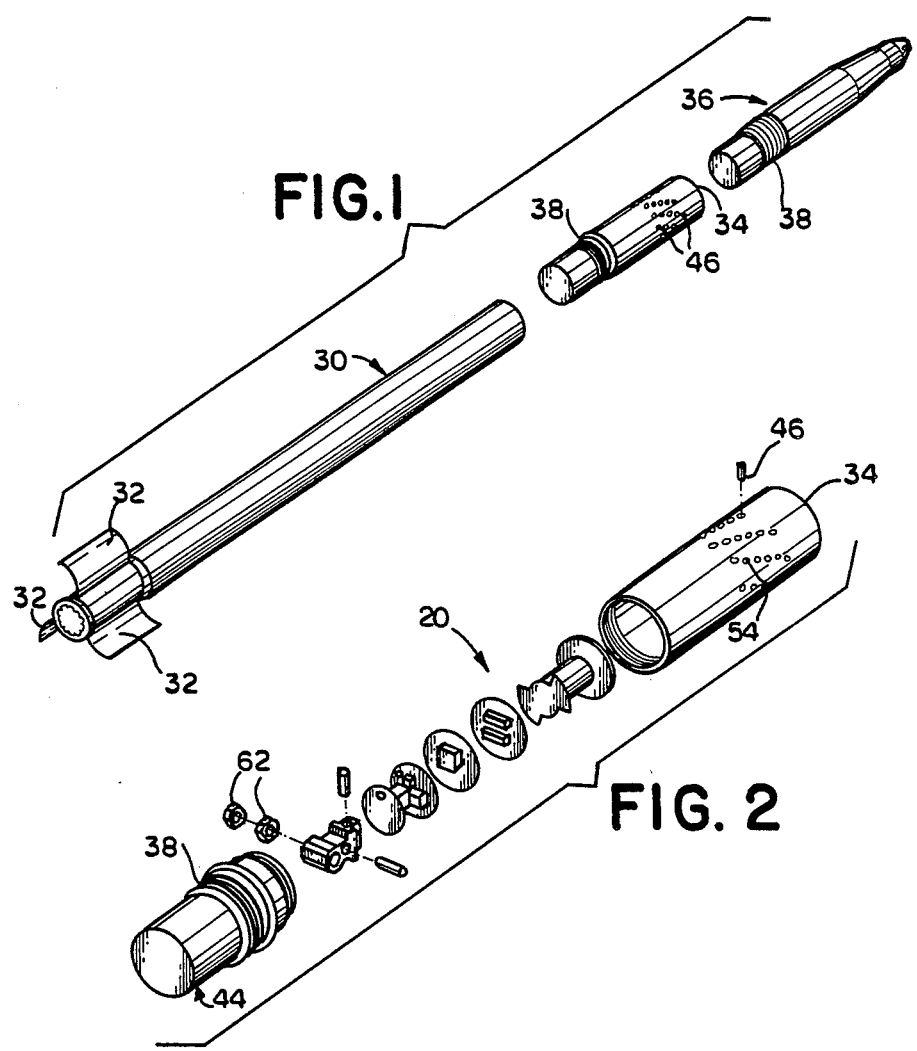
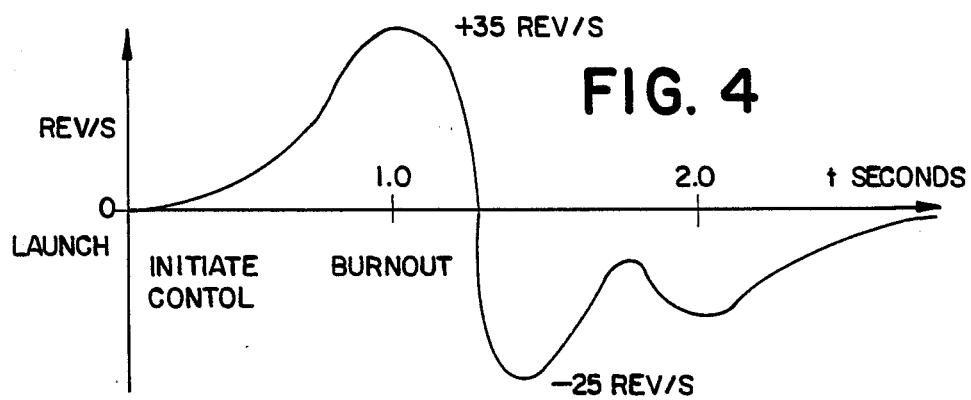

SELF-CONTAINED SUPPLEMENTAL GUIDANCE MODULE FOR PROJECTILE WEAPONS

The U.S. Government has a paid-up license in this invention and the right in limited circumstances to require the patent owner to license others on reasonable terms as provided by contract No. N60921-87-C-A102 awarded by the Naval Surface Warfare Center, Dahlgren, VA 22448-5110.

BACKGROUND OF THE INVENTION

1. Field of the Invention

This invention relates to the field of projectile guidance apparatus, and in particular to an inexpensive conveniently-added-on supplemental guidance module which can be interspersed between the warhead and the motor or like body of a projectile such as a rocket, being activated by forces produced during propulsion, and operative by actuating peripheral incremental explosive charges to damp deviations from a nominal one gravity flight path.

2. Prior Art

A variety of means are known in the prior art for controlling the flight of a projectile weapon subsequent to launch. Such means may include very-sophisticated inertial guidance mechanisms capable of accurately monitoring acceleration of the projectile weapon and thereby keeping track of the location of the projectile even after a flight of many miles The present invention, however, is concerned with a low-cost supplemental guidance system that can be employed at minimal expense in connection with standard forms of direct fire rockets and other projectiles in general purpose use, and will incrementally improve the accuracy thereof. Many projectiles include a body and a payload, with means for propelling the body and payload toward a target. The payload may be a nose-mounted explosive charge, or the nose may contain a fuse for igniting an explosive charge in the body. Typically the nose is threaded to the body. Where the projectile weapon is a rocket, the body of the rocket includes the rocket motor and propellant supply for driving the rocket forward. The explosive charge, warhead or other payload is functionally independent of the body and is located in a nose section which is threaded to the rocket body. A rocket of this type in the U.S. arsenal is the Mark 66, mod. 0 or mod. 1. The rocket has a plurality of arcuate tail fins which spring out upon launch, from a stowed location flat against the cylindrical rocket body, whereupon the fins impart a stabilizing spin to the rocket during flight. The fins are arranged such that during the flight the direction of spin changes. The propellant burn produces a spin which the fins cancel and then reverse after the fuel propelling the rocket is exhausted. The Mark 66 rocket body can be deployed with a number of different warheads. These include, for example, practice inert warheads, explosive charges, armor piercing charges, incendiary white phosphorous charges, aerial flares or anti-personnel charges such as fragmentation devices and/or flechettes. Accordingly, based upon tactical needs, the user can deploy whichever of the rocket warheads needed to produce the desired effects and thus adapt the available ordnance to the requirements of the situation.

The prior art includes a variety of different guided missiles, for example remotely-guided missiles that are attached to a controller at the point of launch by means of thin wires which unspool during flight, self-guided missiles which seek a point of infrared radiation or which home on the reflection of a laser. A typical inexpensive barrage rocket, however, is simply aimed and fired, being a direct fire device with no means provided to monitor the accuracy of flight. During launch or after launch, however, a number of disruptions can occur which may cause the rocket to diverge from the nominal path from the point of launch to the target. With certain types of payloads, the accuracy of the rocket is of less concern than with other types. For example, a smoke payload or an anti-personnel fragmentation payload need only generally hit the target. An armor-piercing round, however, must be quite accurate in order to successfully pierce defensive armor. While it might be possible to equip all the rocket bodies with supplemental guidance systems in the rocket body, thereby achieving the accuracy and/or range needed for accuracy-sensitive payloads such as armor piercing charges this would not be cost effective, and may be counterproductive. The accuracy of the rocket or its cost would be unnecessarily increased for some uses. Given the compromises often made and the design trade offs involved in a rocket design, the designed accuracy would probably be only marginally adequate in accuracy-sensitive situations. Therefore, there is a need to provide a supplemental guidance system for a rocket body which is optional. The supplemental module should be adequate for accuracy-sensitive charges, self-contained, and having no electrical connections and drawing no power, control or sensory input from the payload or the rocket body.

Such a supplemental guidance apparatus would be useful not only in rockets, but also in other forms of projectiles such as artillery and mortar rounds. In connection with the Swedish "STRYX" projectile weapon, a five inch mortar-type shell is lobbed toward a target, the shell including microwave radar means to detect the target and fluid nozzles guiding the projectile on the downstroke, to home on the target. The control is not a self-contained supplemental apparatus. Variations in position of control surfaces are likewise used for guidance, as disclosed in a number of U.S. patents. In U.S. Pat. No. 4,579,298-Thomson, means are provided to axially deflect the nose of a projectile, using solenoid means disposed in the body of a rocket. The device would be inappropriate for use with spin-stabilized devices and has no means for separating the nose section from the body to make the guidance device optional. U.S. Pat. No. 3,141,411-Menke uses a plurality of incremental auxiliary charges to deflect a projectile. The charges are successively deployed at a single reaction motor provided with a detonator and located on the side wall of the projectile weapon. When needed, another of the incremental charges is placed in the side receptacle and detonated when the side receptacle is at the required angular position, being thereby intended to aim the projectile (a rocket) slightly nearer to the target. In this case, the target is detected optically, the rocket being adapted to home on an infrared radiator.

U.S. Pat. No. 4,374,577-Brown et al discloses another form of asymmetrical movable projectile nose. Means are disclosed in this patent to rotate an asymmetrical nose surface as required to deflect the path of the projectile.

U.S. Pat. No. 4,444,119-Caponi teaches a projectile having a plurality of impulse generating explosive charges around the outside, these charges being arranged according to the disclosure to translate the projectile laterally during flight. This apparently requires that the charges be mounted at the same axial position as the center of gravity. In U.S. Pat. No. 3,034,434-Swaim et al, a plurality of such charges are located well forward of the center of gravity of the projectile, such that attitude of the projectile can be corrected as required. The Swaim patent as well as each of the foregoing patents, disclose means designed into each and every rocket of that type, and not a supplemental system which as a wholly self-contained module can correct the attitude of any projectile to which it is attached, and which permits the projectile to operate without using a self-contained supplemental guidance system, if so desired.

In order to guide a projectile with inertial or motion sensors, it is necessary to sense the position of the projectile over time, comparing the position to the expected position, given a nominal flight. With a spin-stabilized projectile, the spin complicates matters, it being necessary to consider the relative orientation of the projectile to vertical In U.S. Pat. No. 4,672,753-Kent et al, a sensor including a toroidal passage with electrical contacts detects the passage of electrolyte fluid for indicating a change in attitude of the sensor. Tilt sensors of this general type are also disclosed in U.S. Pat. No. 4,167,818-Cantarella et al and U.S. Pat. No. 4,628,612-Hori et al. These tilt sensors are normally slow-acting sensors that cannot routinely be employed in a guidance apparatus without some consideration to the fast response time needed. In U.S. Pat. No. 4,628,729-Thoone, the attitude of a vehicle (e.g. an airplane) is sensed using rotational acceleration sensors together with static angle sensors.

Means for detecting the position of a vehicle, such as rocket or other projectile, are also disclosed, for example in U.S. Pat. No. 4,542,870-Howell; U.S. Pat. No. 3,327,631-Howard et al; and U.S. Pat. No. 4,328,938-Reisman et al. In each case the guidance devices are integral with the basic propulsion systems of the rockets or the like, rather than being self-contained add-on modules.

U.S. Pat. No. 4,677,913-Farace and U.S. Pat. No. 4,372,212-Hoelzen et al employ linear or rotational accelerometers such as gyros or the like, in connection with rocket guidance systems (also not of the self-contained type). In these patents, however, the means detecting acceleration linearly (i.e., along the line of flight) or rotationally, also form parts of a safe-and-arming device which disables the control until launch is detected, the sensors thereafter being employed to monitor the position of the projectile.

Notwithstanding all the sophisticated and presumably effective means for guiding projectiles toward a target, there is still a need to incrementally improve the accuracy of inexpensive projectile weapons such as barrage rockets, mortars, ballistic projectiles and similar weapons which may be expended in great numbers. Improvements to the basic propulsion system are not cost effective if each projectile thus requires an expensive guidance system. According to the invention, a supplemental guidance apparatus is provided which is wholly self-contained. Where the projectile to be guided is a rocket having a payload, warhead or fuse device attached on the nose the supplemental device simply is placed between the warhead (or fuse, etc.) and the projectile body, having the required male and female structure as necessary for physically fitting between these parts, but not relying on them for power, sensing or output actuation. On-board batteries, sensors, control means and incremental peripheral thrusters allow for sensing and correction of attitude during the rocket burn, and thereafter. The control means include a programmed processor preferably responsive to inexpensive accelerometer/gyro devices including piezoelectric or fiber optic angular rate sensors for sensing rates of pitch and yaw, and preferably including axial acceleration and roll (spin) sensing devices for detecting launch, and rotation, respectively.

Insofar as the above-mentioned prior art teaches in general the correction of flight path deviations by means of integrating the outputs of accelerometers and the like, their teachings are incorporated by reference. Similarly, the safe-and-arming techniques of these references are also incorporated. The invention improves upon the devices of the references, in the inexpensive and self-contained add-on nature of the supplemental guidance apparatus of the invention which is apt for use with standardized projectile weapons, especially when deployed with accuracy-sensitive warheads, such as armor piercing rounds.

SUMMARY OF THE INVENTION

It is an object of the invention to provide a supplemental guidance apparatus that can be optionally used with selected payloads on standardized rocket bodies such as barrage rockets.

It is another object of the invention to produce a wholly self-contained supplemental guidance apparatus at minimum expense and with maximum dependability.

It is a further object of the invention to employ insofar as possible the benefits of sophisticated and expensive control apparatus in connection with inexpensive projectiles which are deployed in large numbers in tactical situations.

It is yet another object of the invention to provide a range-insensitive and target-insensitive guidance device for damping deviations from a nominal one gravity flight path of a projectile subsequent to launch.

These and other objects are accomplished by a self-contained supplemental guidance module for use with a projectile weapon having a connected body and payload attachable to the weapon between the body and payload. The module includes a self-contained power supply, acceleration sensors, a vertical tilt sensor and a plurality of incremental charges angularly spaced around an outer periphery of the module. A control processor in the module is operable responsive to the position of the module as detected by integrating signals from the sensors to calculate deviation of the projectile from a nominal flight path, taking gravity into account, and to activate individual incremental charges when deviation exceeds a threshold and the incremental charge is in position to reduce the deviation. The supplemental guidance module is particularly applicable to barrage rockets, and includes a multi-level safe-and-arm apparatus initiating operation upon detection of sufficient sustained axial thrust and spin caused thereby and disabling operation in the event of loss of thrust or of inadequate sensor signals.

BRIEF DESCRIPTION OF THE DRAWINGS

There are shown in the drawings the embodiments which are presently preferred. It should be understood, however, that the invention is not limited to the precise arrangements and instrumentalities shown in the drawing, and is capable of embodiment in various other groupings of elements, in accordance with the invention as defined in the appended claims.

In the drawings,

FIG. 1 is an exploded perspective view of the invention as applied to a 2.75 inch direct fire barrage rocket, with the supplemental guidance system of the invention shown in place for mounting.

FIG. 2 is an exploded perspective view of the supplemental guidance module.

FIG. 4 is a typical graph showing typical variation in spin rate over a period from launch until after burn-out.

FIG. 6b is a schematic diagram illustrating operation of the sensor of FIG. 6a.

FIG. 8b is a partial section view of the tilt sensor of FIG. 8a.

DETAILED DESCRIPTION OF THE PREFERRED EMBODIMENTS

Figure 3:
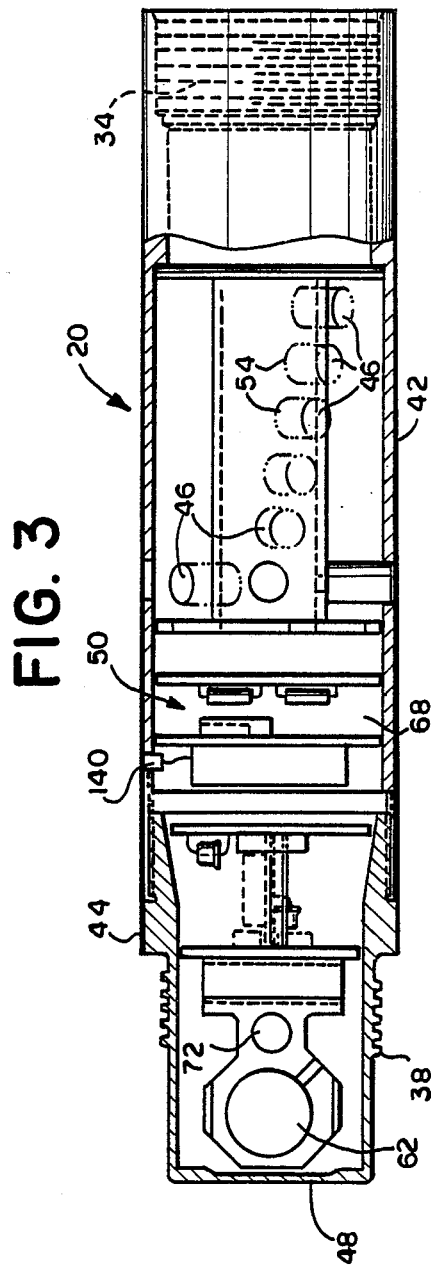
FIG. 3 is a section view through the module of FIG. 2, as assembled.

The invention reduces the free-flight divergence of a direct fire rocket or other projectile from a precisely correct theoretical path. Various effects may result in divergence from a nominal path. The nominal path will in any event not be a straight line, the projectile accelerating downwardly with gravity at a constant rate of acceleration, i.e., one gravity. Other effects which may introduce divergence include launcher interfaces, mass imbalances, variations in initial fin deployment, meteorological effects (i.e., wind), motor inconsistencies and radial displacement of the center of gravity or of the thrust line, from a geometric center. These variations are corrected by use of a wholly self-contained inertial guidance sensor and a computing control processor operable to sense initial orientation of the projectile and thereafter to manipulate the signals of sensing devices at least sensing rotational acceleration or angular rate around mutually-perpendicular axes. The control processor compares the current instantaneous projectile attitude with a nominal projectile attitude, preferably several hundred times per second, taking into account gravitational acceleration. When the attitude varies from nominal by an amount equal to or greater than a predetermined threshold, one of a plurality of incremental thrusters located around the periphery of the projectile is discharged, thereby damping the deviation and returning the projectile to a more nearly nominal attitude along the flight path. The result is reduced projectile divergence, which translates into better accuracy.

The invention is described primarily with respect to a 2.75 inch direct fire barrage rocket. The same considerations are applicable to other forms of projectiles, for example ballistic rounds, mortars, parachute-deployed devices and the like. The control is useful to sense and damp variations from nominal attitude for whatever reason.

As shown in FIG. 1, the self-contained modular guidance apparatus 20 fits between the rocket body 30 and payload or warhead 36 of a rocket or other projectile. The rocket normally has the payload or warhead 36 attached directly to the body 30 by means of interfitting male and female threads 38, 34, respectively. The payload is simply threaded into the rocket body, the rocket body having a supply of propellant fuel and being operable to discharge gases rearwardly to propel the rocket forward. Upon launch, a plurality of resiliently-mounted fins 32 are released from a sabot and spring out from the body of the rocket where they were stowed. During propulsion, exhaust streams are directed axially rearward and also tangentially. As the rocket fuel is expended, a spin is imparted to the projectile, and upon burn-out, the fins 32, which are opposed to the spin produced by the propellant burn, reverse the spin direction. Typical spin rate over time is graphed at FIG. 5.

For those rockets or other projectiles which are to be provided with a supplemental guidance apparatus, the modular apparatus 20 is mounted by simply unthreading payload 36 as seen in FIG. 1, threading supplemental guidance module 20 in its place, then threading the payload 36 into module 20 where corresponding threads 34 are also provided. The overall length and weight of the projectile are increased slightly, but not so much as to detract from operation.

Upon firing, a force responsive means in module 20 senses the very-considerable axial acceleration and enables an internal control processor, for example by connecting battery power thereto. If all is well, power is latched on. The processor monitors pitch, yaw and roll position sensors, being programmed to calculate attitude, compare it to nominal and to fire incremental peripheral charges 46, as required to alter the attitude of the rocket more nearly toward nominal. Module 20 is mounted forward of the center of gravity of the rocket, the incremental charges 46 being thus adapted to cause the projectile to rotate about its center of gravity, responsive to the discharge of the incremental charge.

Module 20 is shown in detail in FIGS. 2 and 3. The incremental charges 46 are disposed at angularly spaced intervals around the periphery of the sidewall 42 of the module. A substantial axial length of the module is taken up in the female threads 34, which engage with threads 38 on the payload 36. Conversely, within male threads 38 is provided a hollow space for receipt of the on-board power supply, sensing and control devices. In particular, charges 46 are disposed in cylindrical bores in sidewall 42, being connected by conductors running behind the bores to drivers which conduct under control of the control processor. The charges are electrically activated in this manner, being much like blasting caps.

FIG. 3 shows the respective operational elements in cross section. Incremental charges 46 are disposed in thruster sockets 54 around the periphery. In the embodiment shown, six rows of eight thrusters 46 are provided, however, it will be appreciated that at least one row and preferably a plurality of rows can be provided as necessary to ensure that during the length of almost any flight, sufficient thrusters will be available such that all the thrusters are very seldom exhausted in attempts to correct the attitude of the projectile. The thrusters preferably are arranged in a spiral configuration by angularly displacing each ring of thrusters from its neighboring rows. In this manner the forty eight thrusters define a 360 degree configuration with thrusters disposed every 7.5 degrees.

An internal cavity 50 is defined within the side walls of the supplemental guidance module 20, including the space within the male threaded area 38. A top section 44 can be threadable to enclose the operational devices. The wall between ends of the module can be left open, for example for passage of leads to the thruster sockets. It will be appreciated that module 20, which is totally non-interactive with either the payload 36 or rocket body 30, need not be of any particular material, conductive or not. Therefore, module 20 can be a hard plastic material, for example polycarbonate. It is preferred, for resistance to electromagnetic pulses, to build the module out of a conductive material such as steel or aluminum. In that case, it is necessary to provide a passageway for any conductors leading to side-looking sensors and/or to each of the incremental charges 46. A ground conductor can be provided by the conductive wall in which the thrusters are located.

The thrusters 46 can be arranged as short cylindrical charges with a pair of conductors extending radially inwardly through holes in the sidewall 42. The conductors can be arranged as push pins which snap into corresponding holes in a flexible printed circuit element extending along the inside of sidewall 42 to connect the thruster conductor pins to the thruster drivers.

The bottom wall 48 of the module 20 is shown in FIG. 3 to be monolithic with the remainder of the sidewalls. This wall 48 can also be threadably attached, for example to internal threads extending along the inner surfaces of cavity 50.

Batteries 62, for example a plurality of pairs of high power lithium batteries, are preferably disposed at one end of cavity 50, being connected to provide opposite voltage polarities for operation of the sensors and control apparatus, and to fire individual thrusters 46, when an individual thruster is addressed by the microprocessor via an appropriate thruster driver. In addition to battery 62, the sensors and controls can be located in subassemblies within the larger assembly area 50. The subassemblies or their respective parts can be connected to one another, for example, by flexible circuit cards. In the embodiment shown, a control assembly 68, axial and radial force switches 104, 114 and angular rate or accelerometer assemblies 72, 73 are disposed in the cavity 50, and are connected by flexible circuitry.

It is possible to include in the module a plurality of accelerometers and/or angular rate sensors and means integrating the outputs of the angular rate sensors, or twice integrating the outputs of the accelerometers, to calculate linear displacement in three mutually-perpendicular axes, and also rotation in three mutually-perpendicular axes. According to the invention, however, linear translational movements in directions lateral to the flight path are not the basis of control, the control is instead based upon detecting initial module attitude at the beginning of translation in an axial direction and detecting, and if necessary correcting for, rotation around the pitch and yaw axes. This is done while monitoring roll to account for instantaneous position relative to vertical, and possibly rotational acceleration or deceleration as well. It will be helpful to discuss the parameters of a typical flight of a rocket such as a 2.75 inch direct fire barrage rocket. FIG. 4 illustrates the timing and spin rate as the rocket progresses along the flight path.

Upon launch, the propellant in the rocket body 30 is exhausted after only about one second. During this time, the spin rate of the projectile increases as shown in FIG. 4 from zero to a maximum of about 35 revolutions per second. It is presently preferred that the control apparatus initiate operations as soon as possible after launch. This allows discrepancies due to variations immediately associated with launch to stabilize, including electromagnetic variations, pressure variations and the like. Accordingly, control is initiated after 0.1-0.15 second following the initiation of launch, and preferably at about 0.1 second. The rocket normally clears the tube after about 0.088 second. Initiation of control at 0.1 second allows time for the electrical noise and physical jarring associated with launching, jettisoning the sabot and departing from the launcher apparatus, without use of any incremental charges 46 while in the tube, which could be dangerous.

After launch, the spin rate increases with consumption of the rocket fuel to a maximum of about 35 revolutions per second, whereupon the fuel is exhausted and burn-out occurs. During the burn, the rocket may accelerate for example at about 60 to 80 gravities, the velocity at the end of the burn being 2,000-3,000 feet per second. After burn-out, fins 32 reverse the direction of spin, the spin dropping to about 25 revolutions per second in the opposite direction then dips briefly to a rate of 5 to 7 revolutions per second, before returning to about 20 revolutions per second. After that the spin rate decays smoothly as speed drops off. The variation in spin is due to the interplay of motor thrust, dynamic and aerodynamic forces on the body. The attitude control according to the invention can be operated for 2 or 3 seconds, preferably the guidance being terminated after 2 seconds, this normally being sufficient time to reach the target or at least to damp usual divergence influences. Divergence-producing forces are most critical at lower velocities of the rocket and are often caused by variations associated with expending the propellant, which variations of course end upon burn-out.

Figure 5:
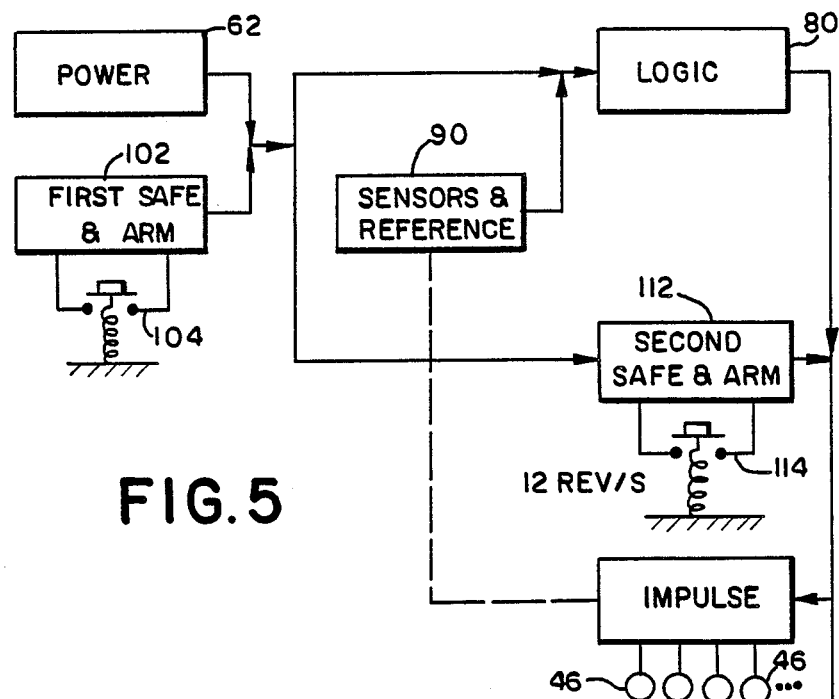
FIG. 5 is a schematic diagram showing the functional interconnection of the control processor and safe-and-arming switches according to the invention.

FIG. 5 illustrates safe-and-arming aspects of the invention, whereby control processor 80 is operable to activate incremental charges 46 responsive to conditions as sensed through sensors 90, but only in connection with actual rocket firing and only after all sensors appear to be operational, with readings as expected for typical flight variations. As shown in FIG. 5, the on board battery supply 62 is connected to the processor 80 and the remainder of the devices through a safe-and-arm switch 104, which switch is responsive to acceleration in an axial direction. Preferably, switch 104 is a momentary force responsive switch which will close the circuit supplying power to processor 80 immediately with occurrence of an axial force of about 40 gravities. This is well below the 60 to 80 gravities expected with actual launch. Should the projectile accelerate at the 40 gravity rate or more, the initial safe-and-arm device 102 is activated to connect power (or provide a status signal indicating acceleration) through switch 104 to processor 80, sensors 90 and possibly also to the incremental charges 46, through a second safe-and-arm device 112.

An axial acceleration of 40 gravities could occur when a projectile is dropped on its tail against a hard surface, as might happen during shipping and/or loading. Accordingly, processor 80, operating using current from a capacitor which charges promptly upon closure of safe-and-arm switch 104, checks the status of device 102 to ensure that the apparent acceleration was not only a brief jolt. safe-and-arm switch 104 must remain engaged (i.e., the acceleration must remain over 40 gravities) for a predetermined time before the control can commence. The status of device 102 is an input to the processor 80. The defined actual delay time effectively distinguishes a dropping incident from firing.

While the status of device 102 can be an input or interrupt to processor 80, it is also possible to arrange logic elements to monitor axial acceleration (switch 104), sensor-operative status indication signals and power-on signals using a logic gate.

Should the sensors be operative and should switch 104 be closed after a preset interval, the power supply is thus available to the remainder of the device. Connections can be made via a relay paralleling switch 104 and/or a second safe-and-arm device 112, to latch the power on. Therefore the power from battery 62 remains available even after the propellant is exhausted and the acceleration drops off. It is possible to arrange switch 104 to latch itself on when sufficient acceleration is experienced for a certain time, for example by pneumatic means or the like as are known in connection with latching time-out relays. Alternatively, the power can be latched using an output from processor 80 to turn on an SCR (not shown) connected in parallel with switch 104 to latch power on.

Assuming switch 104 remained closed for an adequate time and control power is now latched on, processor 80 must monitor pitch, yaw and roll of the projectile and make appropriate corrections by reorientating the projectile using incremental thruster charges 46, which cause the projectile to vary in pitch and yaw, around the center of gravity of the projectile located to the rear of control module 20. Should control processor 80 determine that an incremental charge 46 should be activated to correct a noted error, then charges 46 will be activated provided the second safe-and-arm 112 is also operable to enable power to the charges 46 through their driver transistors. Safe-and-arm device 112 is responsive to rotation (spin) of the projectile, and latches on or is bridged across logically in a similar manner to device 102, in the event of rotation exceeding a predetermined minimum indicative of correct sensor operation and/or launch, for example, 10 to 12 revolutions per second. As shown in FIG. 4, control will be initiated at a certain rotational rate during the increasing rotation of the projectile. Switch 114 in safe-and-arm 112 provides a signal or a switch closure operative to connect power from batteries 62 through safe-and-arm 104 to the incremental charges 46. The charges are only fired, however, when individually addressed by processor 80. Processor 80 can directly fire charges 46 via driver transistors 56 connected by their bases to outputs of processor 80, or alternatively, a multiplexing arrangement can be employed to provide the necessary addressing of individual charges 46 using a lower number of lines than available as outputs from processor 80. In that event, processor 80 loads address information to a multiplexer (not shown) and issues a strobe or fire instruction routed through gating to decode which individual charge has been addressed, whereupon the addressed charge 46 is fired by current conducted through its electrically-detonated element via associated driver transistor 56.

According to the foregoing safe-and-arm technique, processor 80 can only fire charges 46 when the projectile is in flight, when the sensor output signals appear indicative of normal and correct launch and sensor operation, and the projectile is clear of the launcher.

Rather than monitor both translation and rotation, pitch and yaw are monitored using gyroscopic sensors operable to sense rotation around two mutually perpendicular axes, i.e. the pitch and yaw axes.

Figure 6B:
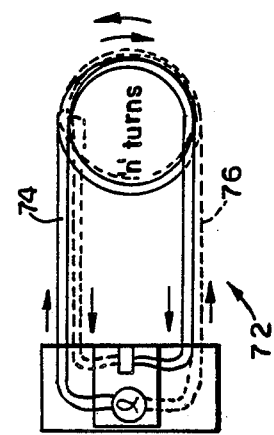
Figure 6A:
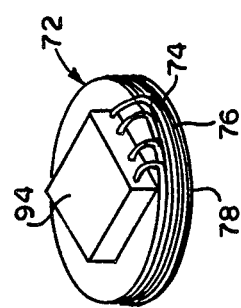
FIG. 6a is a perspective view of a fiber optic angular rate sensor for use in the supplemental guidance module.

The third mutually perpendicular axis, i.e., roll, is preferably not monitored by sensing and integrating roll acceleration. Roll can be sensed more directly by sensing gravity, heat radiation or other laterally applicable parameters which change as a function of vertical orientation. Preferably, accurate accelerometers or angular rate sensors for pitch and yaw are provided without the need for spinning gyros, although such gyros can be provided and uncaged upon launch. One possible gyroscopic sensor arrangement is shown in FIGS. 6a and 6b, being a fiber optic type gyro device which senses rotational velocity. In this device, a coherent light source is caused to illuminate two oppositely-wound fiber optic coils. The coils are preferably quite long and trace a large number of revolutions, for example several hundred to a thousand. Inasmuch as the coils are faced in opposite directions, doppler effects on the coherent light operate in an opposite sense on the two multiple-loop coils. Rotation of the whole accelerometer 72 thus causes a red shift in one of the coils 74, 76 and a blue shift in the other, the speed of light being independent of velocity but the phase and/or frequency not being independent of velocity. The returning signals from the two coils 74, 76 are beaten against one another or compared as to their phase, providing an interference signal including components that translate into angular rate, e.g., frequency or phase components at the sum and difference of the two frequencies or phases. The frequency of the components can be calculated by counting the beat frequency against time or comparing the extent of phase difference to decode the angular velocity experienced. The velocity is integrated to arrive at angular displacement of the device. Velocity can be differentiated to arrive at acceleration. Preferably only the displacement and instantaneous angular velocity are monitored. Two gyro sensors 72 (or more accurately, angular velocity detectors) are provided, one for yaw and the other for pitch.

Figure 6C:
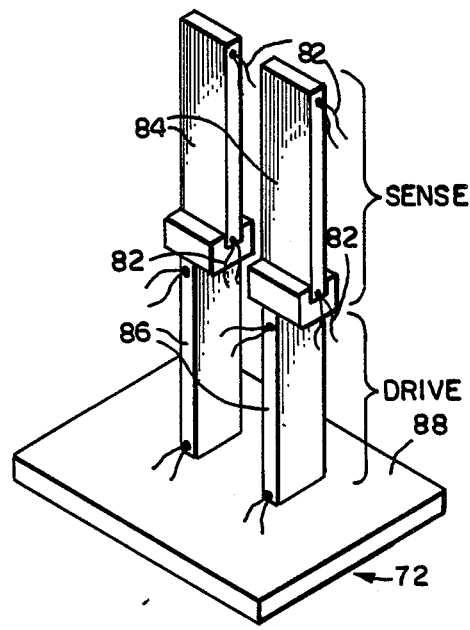
FIG. 6c is a perspective view of a piezo-electric angular rate sensor for use in the module.

An alternative angular rate sensor is illustrated in FIG. 6c. In a paired configuration, a lower piezo-electric crystal 86 carries an upper piezo-electric crystal 84, mounted at right angles to crystal 86. The lower element 86 is mounted to a base 88 and functions as a drive element for initiating vibration when pulsed with a voltage. Each element has separate conductors 82. The upper element 84, which functions as a sensing element, does not bend appreciably when the tine is vibrating unless there is rotation around the sensing axis as shown by an arrow in FIG. 6c. When the sensor is rotated as shown, Coriolis forces cause momentum to be transferred into the perpendicular plane and cause sense element 84 to bend, producing a voltage signal. The signal has an amplitude proportional to angular rate and a phase dependent on the direction of rotation. For immunity to noise caused by vibration rather than rotation, two tines are provided. Rotation affects the two tines oppositely, e.g., 180 degrees out of phase. When the sensor rotates, the tines each produce a signal due to rotation-induced bending, however, directly out of phase. When external vibration occurs, the tines are affected equally, i.e., in phase. By subtracting the signals from one another using a differential amplifier, the angular velocity is sensed with good vibration noise immunity. Angular rate sensors of this type are available from Watson Industries Inc., Eau Claire, WI, (715) 839-0628.

The processor 80 also keeps track of the roll or spin rate and attitude in order to sense (or calculate) at any time what the current orientation of the control module is relative to vertical. This is necessary in order to allow deviation from straight line flight due to the downward force of gravity and also to determine which of the individual incremental charges 46 around the spinning projectile is located most nearly at a point which would correct divergence in yaw or pitch from the nominal (one gravity) flight path. The initial rotational position of the projectile can be sensed, for example, by a side looking passive infrared sensor during an initial roll or series of rolls, and the current rotational position determined by integrating the roll velocity as sensed by a third angular rate senor. Alternatively, the device can be provided with means sensing the instantaneous vertical orientation of the projectile periodically, e.g., several hundred times per second throughout the flight.

Figure 7A:
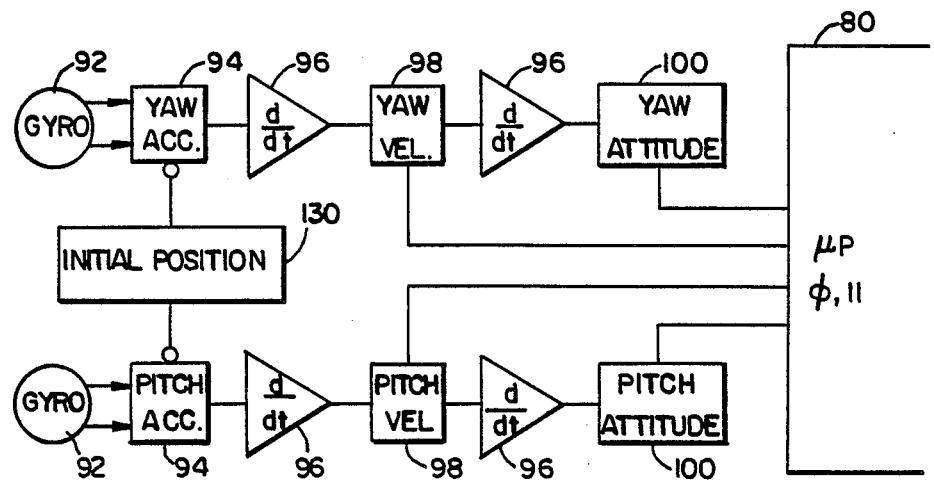
FIG. 7a is a schematic diagram showing operation of pitch and yaw acceleration monitors connected to integrators and to the control processor for determining the angle and amount of thrust required to correct a deviation from nominal.
Figure 7B:
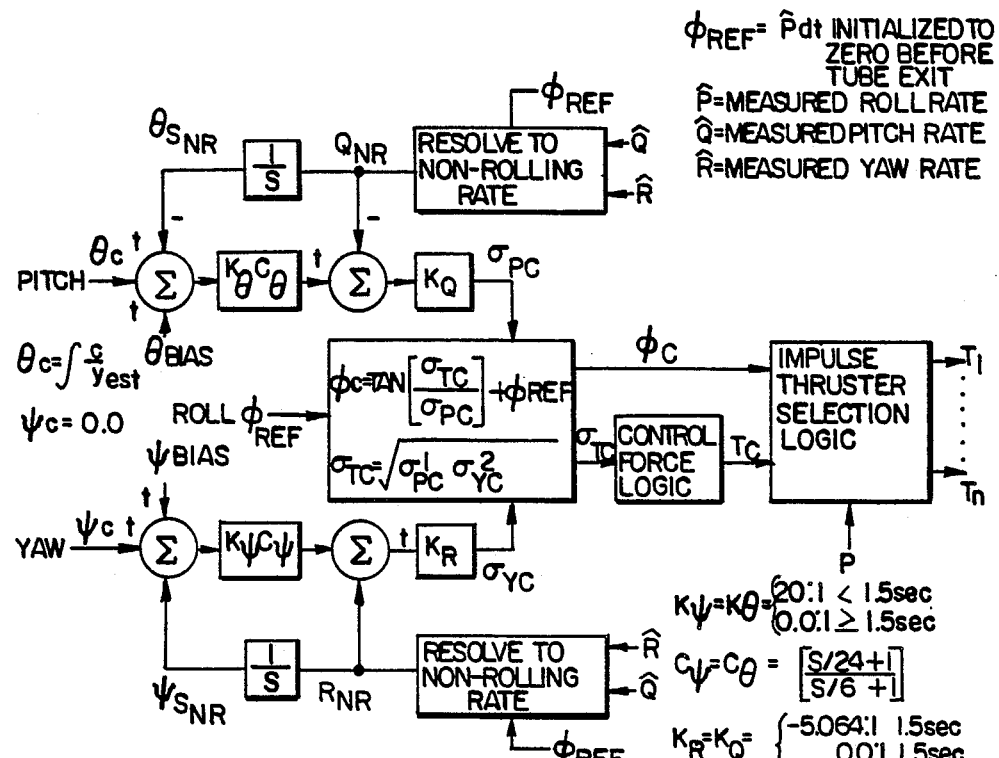
FIG. 7b is a diagram illustrating calculations for resolving pitch, yaw and roll to select thrusters.

As shown schematically in FIG. 7a, outputs of pitch and yaw gyroscopic sensors 92, accelerometers 94 and/or angular rate sensors can be integrated to get velocity and then velocity can be integrated from an initial position as detected by initial position latch 130. These integrations can be accomplished as calculations of processor 80, or the analog levels can be integrated using analog integrators 96 to determine pitch and yaw velocity, and then integrated again to get pitch and yaw attitude, using velocity registers 98 and attitude registers 100, respectively. FIG. 7b sets forth specific equations for resolving pitch, yaw and roll for selection of thrusters.

Processor 80 calculates the angle of deviation and determines which next charge 46 to fire based upon the pitch and yaw velocity and attitude both, these being necessary in order to determine the correct amount of thrust and angular position of incremental charge required to rotate the projectile in the pitch and yaw directions around the center of gravity of the projectile. The particular incremental charge 46 must be activated, however, with due regard to the position of the charge 46 on the rolling projectile at the time of firing. Processor 80 takes into account the current roll rate of the projectile to fire charge 46 when its burn time will be centered on the angle needed to oppose deviation from nominal pitch and yaw. This is preferably accomplished by means of a roll sensor. While the roll sensor can have an accelerometer 94 or angular rate sensor, integrating means 96 and registors 98, 100 for storing roll rate and rotational orientation, preferably the roll rate is monitored periodically and between times the roll attitude and/or rate are interpolated on a more ongoing basis.

Figure 10:
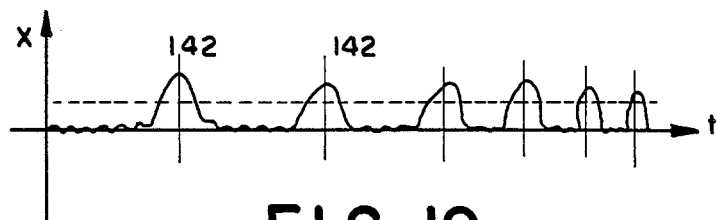
FIG. 10 is a graph showing a typical variation in signal from a side-looking vertical position sensor for use with the invention, during a portion of flight time.

During one or more initial rolls after launch, a side looking infrared sensor 140 can be used to develop a periodic signal similar to that shown in FIG. 10, resulting from variation in heat emissions between the earth and the sky. This signal can be analyzed electronically to find the center of the high or low going parts of the waveform to determine orientation at vertical roll attitude as a certain point in time. That time is used as the base point for integrating roll velocity to calculate roll attitude. The base point can be updated repeatedly, whenever a valid waveform is received for analysis.

In addition to integrating from a time of known vertical roll orientation, it is possible to use the known typical roll rate pattern over time as the basis for calculating the current roll attitude. The typical pattern is shown in FIG. 4. Processor 80 preferably cycles through its sensor monitoring and thruster activating functions at several hundred times per second, wherefore the roll rate will not change drastically from cycle to cycle over certain portions of the flight and the roll rate can be obtained relatively accurately from a lookup table in the memory of processor 80. The lookup table (or the lookup table indexing for selection of data) can be updated in response to actual roll attitude data collected by a side looking sensor or other device. The lookup table can also provide data when infrared measurements are disrupted.

Figure 8A:
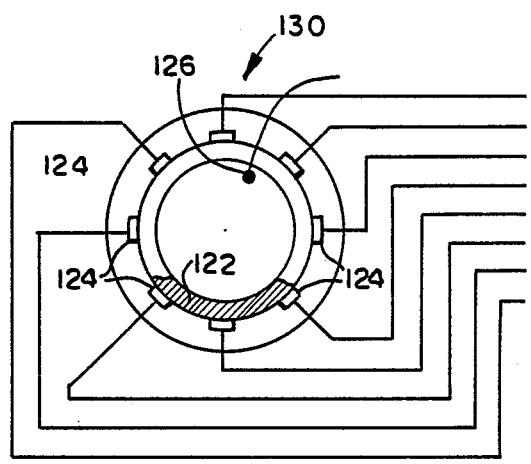
FIG. 8a is a tilt sensor for sensing the orientation of the module relative to vertical.
Figure 8B:
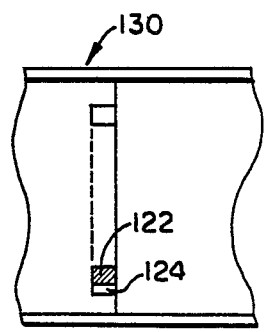

FIGS. 8–10 illustrate additional alternative embodiments for monitoring roll rate attitude. In FIG. 8a a rotational sensor is defined by a toroidal track having a conductive fluid electrolyte 122 therein, and a plurality of electrical contacts 124 disposed around the toroidal track. Electrolyte 122 shorts between a contact on the central portion 126 of the track and one or more of the discrete electrical contacts 124 around the circumference. As the projectile rotates, and given the fact that electrolyte 122 is very thin and flows easily, electrolyte 122 will remain on the lowermost area of the toroidal track as the projectile rotates. It will be appreciated that an axial force of 60 to 80 gravities and a radial force of only a single gravity are acting on the track. A toroidal sensor of this type can be used with a curving array of conductor contacts in two directions, if desired to sense roll and axial acceleration both.

Figure 9A:
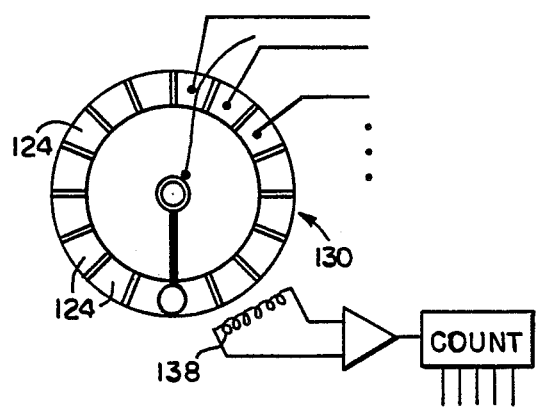
FIG. 9a is a schematic view of a pendulum-type vertical position sensor for use with the invention.
Figure 9B:
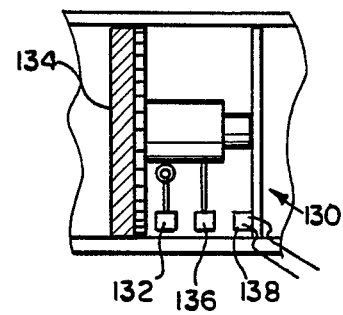
FIG. 9b is a section through the sensor of FIG. 9a, showing dual pendulums therein.

An alternative embodiment is shown in FIGS. 9a and 9b. In this embodiment, a pair of pendulums are employed for sensing the rotational starting orientation and the roll rate, both in a single device. A pair of pendulums 132, 136, both having a magnet defining a distal end weight, are mounted rotationally on a shaft on the longitudinal axis of the projectile. A first pendulum magnet 132 is free to move rotationally and axially, at least over a short distance. The shaft of the pendulum 132 can be resilient such that a sustained force is required to bend it axially back. Pendulum 132 thus is forced axially rearwardly by axial acceleration upon launching the projectile. A ferromagnetic backer plate 134 is provided such that when the projectile is launched, pendulum 132 adheres to one of a plurality of conductive contacts 124, spaced angularly around a circular track, thus closing a conductive path fixing the initial orientation relative to vertical. Pendulum 132 can be arranged such that a substantial axial acceleration, for example 40 gravities, is required before the pendulum will come within adherence range of ferromagnetic plate 134, this element thus being useful as part of the safe-and-arm switch 104, being operable upon acceleration of 40 gravities and being inherently latchable once that acceleration is applied for sufficient time to axially displace pendulum 132. Therefore, electrical contact can be made for switch 104 directly through pendulum 132.

According to the embodiment of FIGS. 9a and 9b, a second pendulum 136 is free only to move rotationally. In a manner similar to the displaceable electrolyte 122 in FIGS. 8a and 8b, pendulum 136 remains oriented downwardly due to gravity as the projectile rotates. A coil 138 or other appropriate sensor produces a pulse in response to passage of the magnetic distal end of pendulum 136, which pulse can be counted and the interval between pulses can be interpolated and/or used in a lookup table method using processor 80 to determine the particular instantaneous rotational orientation and rate of the projectile at any moment.

FIG. 10 illustrates a train of pulses which would be produced, for example via coil 138 responsive to passage of magnet 136. A similar wave form can be produced, for example, by side-looking sensor 140 such as a passive infrared detector. Such a sensor also can be based upon laterally directed radar, and at least during daylight hours the sensor can be responsive to visible light level variations, in either case also producing a train of pulses due to variations in outside parameters as viewed laterally using appropriate sensors whose outputs are monitored by control processor 80. The signals from these sensors are used to determine the instantaneous rotational orientation of the projectile and/or used to update the data or addressing of a lookup table of roll rate over time, such that an appropriate individual charge 46 can be addressed in order to damp variations from the nominal flight path.

Figure 11A:
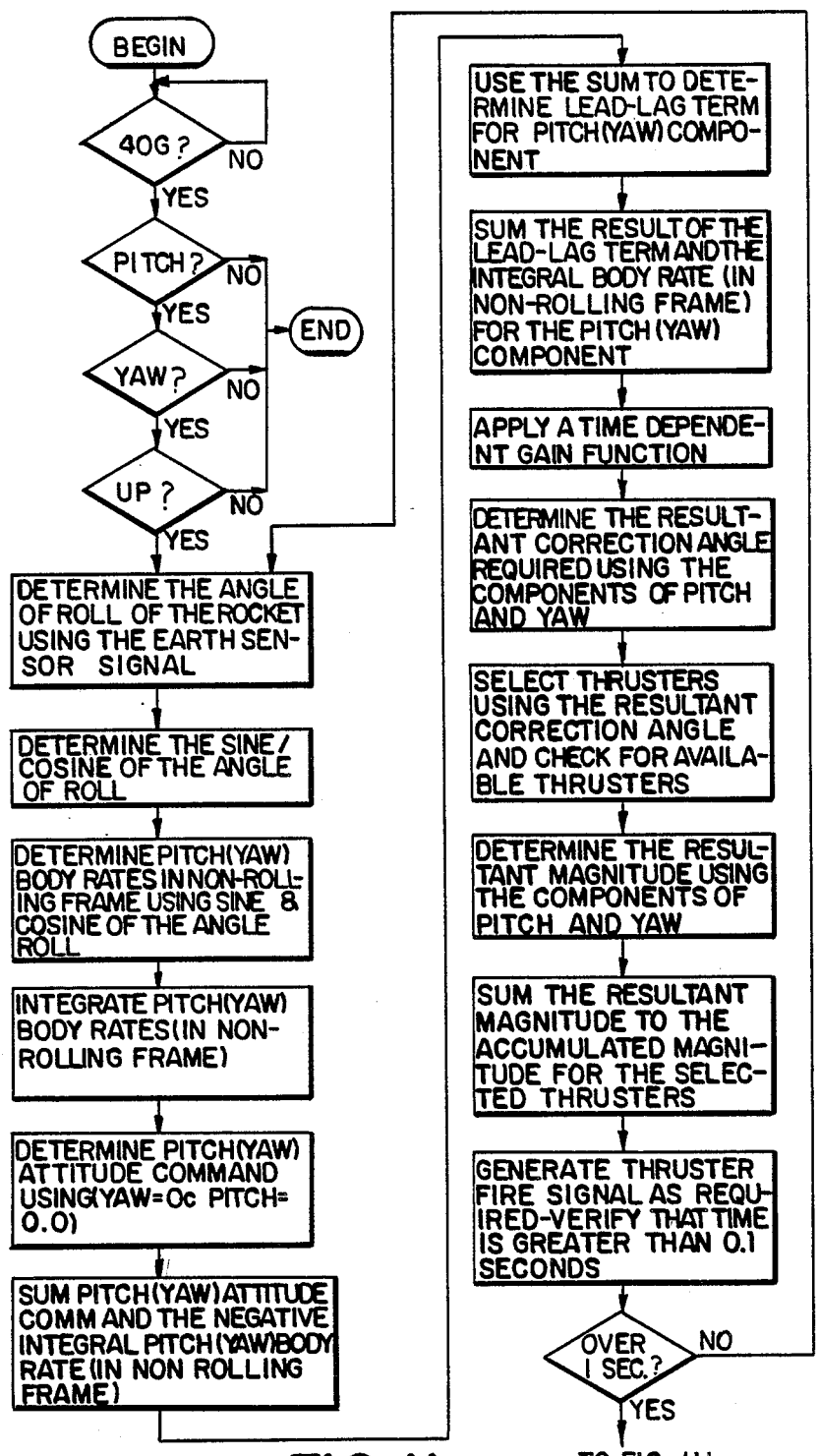
FIGS. 11a and 11b are a schematic flow chart showing the operation of the control processor through the safe-and-arming, and calculation and correction steps during initial phases of flight (less than one second and during later phases).
Figure 11B:
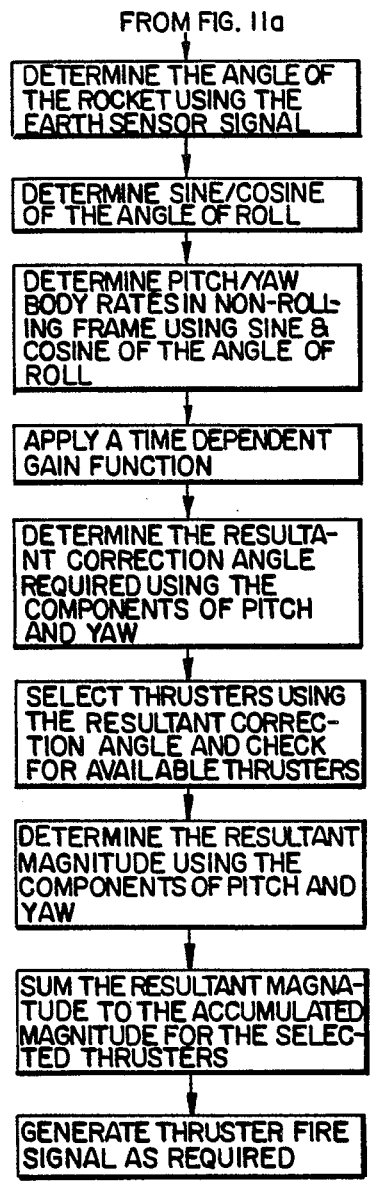

FIG. 11 shows a schematic flow chart detailing the preferred operation of programmed processor 80. Upon initiation of operation, axial acceleration operates switch 104 of safe-and-arm 102, connecting power at least momentarily to the processor and initiating operation. After a short delay, processor 80 determines whether the axial acceleration is still over the predetermined minimum, for example 40 gravities, and if so, processor 80 or other logical means checks for nominal operation of the pitch, yaw and up/down sensors. If the axial acceleration has ceased or if any of these sensors are not providing a signal, processor 80 terminates operations and no control signals are generated. If axial acceleration remains but the sensors are not functional, no thrusters will be detonated throughout the flight. The supplemental guidance module simply shuts down due to the fatal missing signal. If the sensors are found operative, processor 80 repetitively calculates deviation from the pitch and yaw attitude expected at every point along nominal flight path, the nominal flight path being the path followed by the accelerating and spinning projectile from its initial attitude under the influence of one gravity downward acceleration. As shown in FIG. 11, the particular control strategy can be varied during the flight, e.g. at one second. By allowing the nominal flight path to follow the nominal gravity-dependent path, the control becomes insensitive to range of the target. Without such a control, damping variations from a straight line would expend charges 46 in keeping the nose up, possibly causing the projectile to overshoot.

By twice integrating the pitch and yaw acceleration, or by once integrating the pitch and yaw angular rate, both the current rate of change of pitch and yaw and the current pitch and yaw displacement (i.e., the projectile attitude) are calculated and can be compared to nominal attitude figures, which also can be stored in a lookup table, for example in ROM. When the pitch or yaw vary from nominal by an amount greater than or equal to the amount correctable using a single thruster 46, then control processor 80 determines which of the thrusters 46 is most nearly in position to correct the deviation, the thrusters being about seven and one half degrees apart. This requires consideration of the rotational position of available remaining thrusters, and the roll rate, an individual thruster being fired initially slightly in advance of the thruster reaching the required angle, i.e., taking into account the burn time of the thruster in order to center the thrust on the angle of deviation from nominal. The thruster is fired over a very short interval, for example 8 to 15 milliseconds, preferably 10 milliseconds, bringing the projectile more nearly into correct alignment. It may be necessary as a means to correct a transient disturbance, to fire a first thruster to accelerate in a certain pitch/yaw angular direction, and then just before reaching nominal to fire a second thruster aligned (by that time) exactly opposite to the first, such that the projectile decelerates and remains at nominal. A steady disturbance on the other hand may require a plurality of thrusters to make repeated corrections in the same direction. Processor 80 monitors attitude, vertical orientation and rate of change of these parameters to quickly and precisely correct deviations.

Figure 12:
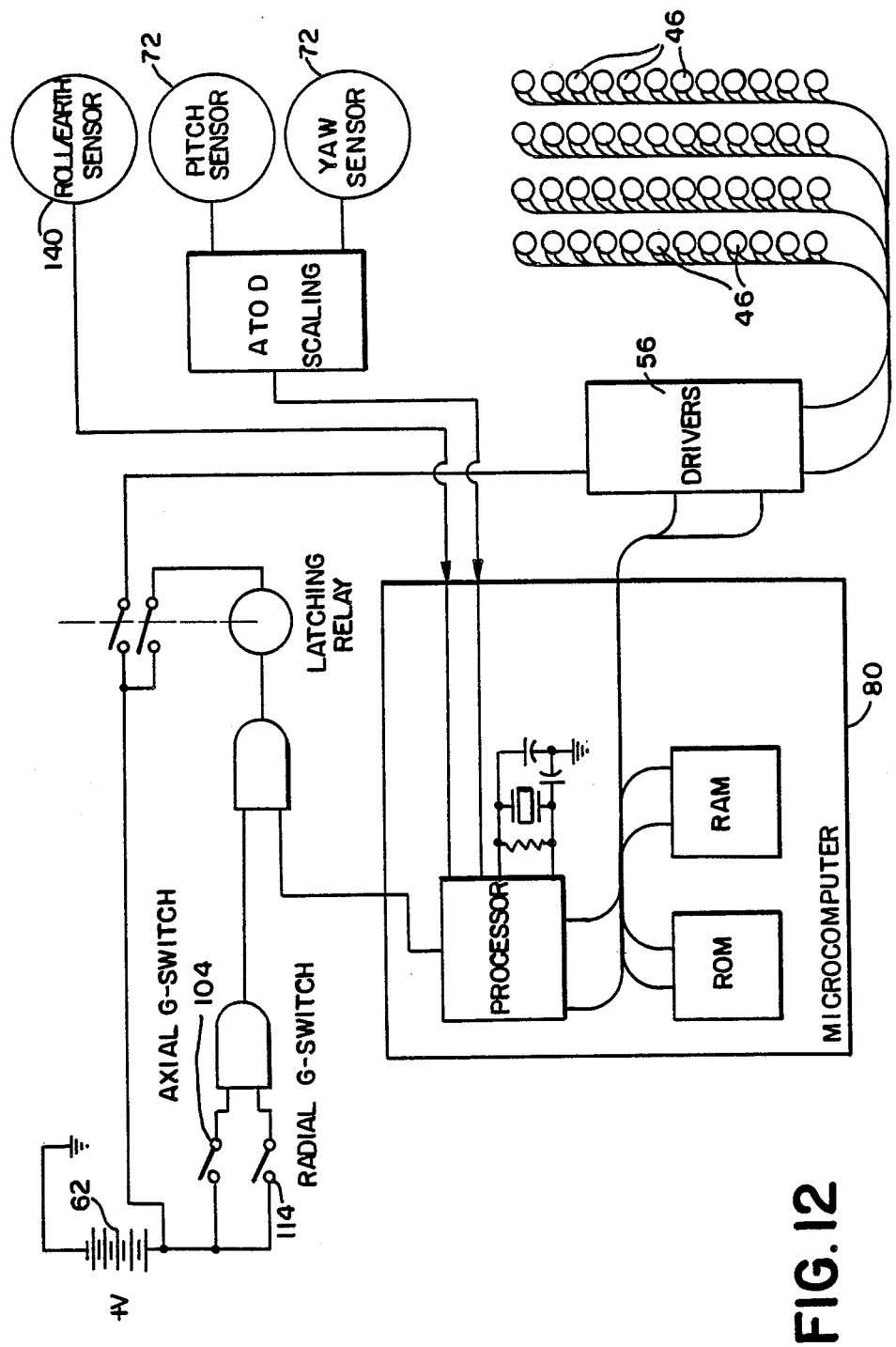
FIG. 12 is a schematic wiring diagram showing an electrical layout of the invention.

FIG. 12 illustrates particular circuit connections within processor 80 and to the various elements connected thereto. Processor 80 includes ROM for storage of program codes and lookup tables and RAM for variable data.

A number of variations on the preferred embodiment are possible and will now occur to persons skilled in the art. The particular type of accelerometer or angular rate sensor employed is subject to a number of variations. An accelerometer can be used, for example based upon a strain gauge, i.e. a weight on a resilient support and means for sensing the level of stress on the support, which is then integrated as above. As noted above a gyro can be employed to produce a measurable force responsive to rotation of a gyro out of its pre-caged orientation. A fiber optic rotational rate sensor for pitch and for yaw are possible, the whole device spinning and the rate of spin being measurable by doppler shift effects. A 10 meter fiber optic cable may be used, having hundreds of loops or for better accuracy thousands of loops can be used. It is possible to use out of phase coherent light sources for the two opposite coils in order to enlarge the phase difference between the light signals to more easily calculate the rotational velocity from the doppler shift. As an alternative technique, inertial forces which cause detectable variations in one or more vibrating tines of a piezo-electric crystal tuning fork can be sensed. A substantial pulsed voltage is required in order to initiate vibration of the tuning fork. Thereafter the inertial effects of angular velocity on vibration are detectable by detecting variations in amplitude, frequency or phase of a voltage across a piezoelectric segment subject to bending due to inertial forces.

The module of the invention can be scaled up or down for other sizes in addition to the 2.75 inch barrage rocket. For larger rockets, other shapes of modules can be used, and, of course, other connections between the payload and the rocket module or the like are also possible. The module can also be scaled up in precision (and also expense) as needed for more expensive or more critical projectiles. It is furthermore possible to employ the same type of guidance system in connection with substantially passive projectiles such as mortar or ballistic rounds, or shoulder fired rockets that burn only briefly, in a manner analogous to the use of the control module with direct fire barrage rockets. The control module an also be arranged, for example, annularly, to leave open a passageway for mechanical or electrical connections between a nose section and a projectile body. This renders the module 20 useful where the projectile nose is a spin-sensitive safe-and-arm fuse which, upon impact, detonates a charge disposed in the projectile body.

The invention as disclosed is a self-contained supplemental guidance apparatus 20 for use with a projectile weapon having a body 30, at least one payload 36 attachable to the body 30 and means for propelling the body and payload towards the target, the apparatus comprising a supplemental guidance module to be fitted to at least one of the body 30 and payload 36, the supplemental guidance module having on-board a power supply 62, sensors 90 and controls 80 for operating the supplemental guidance apparatus apart from connections to the projectile weapon. Sensing means, 92, 104, 114, etc, in the module include position sensing means 130 operative to sense at least one of a starting orientation of the projectile weapon and an instantaneous orientation of the projectile weapon. Actuation means are provided including a plurality of individually controllable incremental charges 46, angularly spaced around a periphery 42 of the module. A control processor 80 in the module is programmed to monitor an output of the sensing means, to calculate deviation from a nominal flight path and to actuate at least one of the incremental charges 46 when said deviation exceeds a threshold and said at least one of the incremental charges is in position to reduce said deviation.

The invention preferably further comprises launch sensing means 104 in the module, operable to detect launch, and connected to the control processor 80 for initiating operation of the supplemental guidance apparatus.

The body of the projectile weapon includes a propulsion motor and means 34, 38 are provided on the module for physically engaging the payload 36 and the body 30, respectively, whereby the module is fittable optionally to the projectile weapon by first separating the payload 36 from the body 30 and then attaching the apparatus 20 between the payload 36 and the body 30. The incremental charges 46 are preferably explosive charges disposed in at least one circumferential band around the module. The position sensing means includes at least one of a tilt sensor 130 and at least one of an accelerometer or rotational velocity sensor 92, 94, the tilt sensor being operative to sense position of the module relative to vertical and the accelerometer being operative to sense acceleration of the module. Means are preferably provided for integrating an output of the accelerometer, the control processor being connected to at least one of the accelerometer and the means for integrating. The accelerometer or rotation sensor can include a two axis gyro operable to detect pitch and yaw acceleration, and further comprising means connected to the control processor for integrating the pitch and yaw acceleration, whereby the apparatus monitors the attitude of the module. The accelerometer can be based on dual fiber optic coils means for detecting a doppler shift in coherent light moving in opposite direction in the dual coils. The accelerometer or rotation sensor can also be a piezo-electric device or the like having a measurably deformable resilient means responsive to inertial forces due to rotation.

The position sensing means preferably includes at least one sensor 130 operable to determine instantaneous orientation of the module at least at one time during the flight of the projectile weapon, an accelerometer operative to sense at least one of rotational acceleration and rotational velocity after said one time, and means integrating said rotational acceleration or velocity from said instantaneous orientation, the control processor being operable to distinguish and allow deviation from a straight line due solely to gravitational acceleration. This renders the supplemental module insensitive to target range.

The position sensing means can include a track sensor 130 having a plurality of segments 124 defining a circular track and a movable element 122, 132, 136 disposed in the track and means 124, 138, for example at each segment detecting presence of the movable element. The movable element can be a pendulum 132, 136 and the device further comprises means 138 spaced around the module for detecting passage of the pendulum. The position sensing means can include a side-looking apparatus having means sensitive to a physical parameter such as infrared radiation which varies with orientation toward and away from the earth.

Preferably a two axis gyro or rotational velocity sensor is provided, together with means for integrating an output from each axis and roll rate sensor or lookup table to determine orientation of the module relative to vertical, the gyro means sensing orientation in pitch and yaw and being connected to the control processor, the control processor thus monitoring pitch, yaw and roll rates as well as instantaneous angular positions.

The invention having been disclosed, a number of variations will occur to persons skilled in the art and aware of the disclosure. Reference should be made to the appended claims rather than the foregoing specification as defining the true scope of the invention.

What is claimed is:

1. A self-contained supplemental guidance apparatus for use with a projectile weapon having a body, at least one payload attachable to the body and means for propelling the body and payload towards a target, the apparatus comprising:
   a supplemental guidance module to be fitted to at least one of the body and the payload, the supplemental guidance module being self-contained and having on-board a power supply, whereby the guidance apparatus is operable apart from electrical connection to the body and the payload;
   sensing means in the module, including position sensing means operative to sense at least one of a starting orientation of the projectile weapon and an instantaneous orientation of the projectile weapon;

actuation means including a plurality of individually controllable incremental charges angularly spaced around a periphery of the module; and, a control processor in the module, operable to monitor an output of said sensing means, to calculate deviation from a nominal flight path, and to actuate at least one of the incremental charges when said deviation exceeds a threshold and said at least one of the incremental charges is in a position to reduce said deviation.

2. The apparatus of claim 1, further comprising launch-sensing means in the module, operable to detect launch, the control processor being connected to the launch-sensing means, the control processor being operable to initiate operation of the supplemental guidance apparatus.

3. The apparatus of claim 2, wherein the launch-sensing means includes a power switch sensitive to axial acceleration, said switch connecting power to at least one of said processor, sensing means and actuation means.

4. The apparatus of claim 1, wherein the body of the projectile weapon includes a propulsion motor and further comprising means on the module for physically engaging the payload and the body, respectively, whereby the module is fittable optionally to the projectile weapon by first separating the payload from the body and then attaching said apparatus between the payload and the body, whereby the supplemental guidance apparatus can be used preferentially with accuracy-sensitive forms of payload.

5. The apparatus of claim 1, wherein the incremental charges are explosive charges disposed in at least one band around the module.

6. The apparatus of claim 1, wherein the position sensing means includes at least one of a tilt sensor, an accelerometer and a rotational velocity sensor, the tilt sensor being operative to sense position of the module relative to vertical, the accelerometer being operative to sense acceleration of the module and the rotational velocity sensor sensing angular velocity around at least one of three mutually perpendicular axes.

7. The apparatus of claim 6, wherein the axes are yaw, pitch and roll axes.

8. The apparatus of claim 6, wherein the module includes said accelerometer, and further comprising means for twice integrating at least one output of the accelerometer, the control processor being connected to at least one of the accelerometer and said means for integrating.

9. The apparatus of claim 6, wherein the module includes the rotational velocity sensor, and further compromising means for integrating an output of the rotational velocity sensor to determine attitude of the module.

10. The apparatus of claim 8, wherein the accelerometer includes a two axis gyro operable to detect pitch and yaw acceleration, and further comprising means connected to the control processor for twice integrating said pitch and yaw acceleration, whereby said apparatus monitors attitude of the module.

11. The apparatus of claim 1, wherein the position sensing means includes at least one sensor operable at intervals during a flight of the projectile weapon to determine orientation of the module relative to vertical.

12. The apparatus of claim 8, wherein the accelerometer detects rotational acceleration around at least one axis of the projectile, and further comprising means connected to the control processor for integrating said rotational acceleration, whereby the apparatus monitors a rotational position of the module.

13. The apparatus of claim 12, wherein the accelerometer detects rotational acceleration around three mutually-perpendicular axes of said module.

14. The apparatus of claim 1, wherein the position sensing means includes at least one sensor operable to determine instantaneous orientation of the module at least at one time during a flight of the projectile weapon, and further comprising at least one of an accelerometer and a rotational rate sensor, operative to sense at least one of rotational acceleration and rotational rate after said one time, and means integrating at least one of said rotational acceleration and said rotational rate to determine changes in orientation from said instantaneous orientation, the control processor being operable to distinguish and ignore such changes in orientation from a straight flight which are due to gravitational acceleration, whereby the supplemental module acts to maintain proper attitude of the projectile weapon regardless of range to the target.

15. The apparatus of claim 14, wherein the position sensing means includes a track sensor having a plurality of segments defining a circular track and a movable element freely disposed in the track and influenced by gravity, and further comprising means at each said segment for detecting presence of the movable element when in proximity with said segment, whereby the track sensor detects orientation of the module relative to vertical.

16. The apparatus of claim 14, wherein the position sensing means includes a pendulum and means spaced around the module for detecting passage of the pendulum.

17. The apparatus of claim 14, wherein the position sensing means includes a side-looking apparatus having means sensitive to a physical parameter varying with orientation relative to the earth.

18. The apparatus of claim 17, wherein the physical parameter is infrared emission.

19. The apparatus of claim 1, comprising a two axis gyroscopic sensor and means sensing orientation of the module relative to vertical, said gyroscopic sensor and said means sensing orientation being connected to the control processor and the control processor monitoring pitch, yaw and rotational position periodically during at least one phase of a flight of the projectile weapon.

20. The apparatus of claim 1, wherein the position sensing means includes at least one rotational rate sensor having a resiliently bendable element subject to bending with inertial forces produced by rotation.

21. The apparatus of claim 14, wherein the position sensing means includes a pendulum on a pivot axis coincident with a longitudinal axis of the module, the pendulum having a mass defining a movable element disposed in a circular track having a plurality of segments, and further comprising means at each segment for sensing one of the position and rate of movement of the mass of pendulum, providing a track sensor for detecting at least one of instantaneous orientation of the module and instantaneous rate of roll.

22. The apparatus of claim 14, wherein the position sensing means includes an apparatus sensitive to a physical parameter varying with orientation relative to the earth.

* * * * *